United States Patent [19]
Orter

[11] Patent Number: 4,532,911
[45] Date of Patent: Aug. 6, 1985

[54] HEAT CONTROLLING COOKER

[76] Inventor: Ralph H. Orter, P.O. Box 2074, Prescott, Ariz. 86302

[21] Appl. No.: 458,658

[22] Filed: Jan. 17, 1983

Related U.S. Application Data

[63] Continuation of Ser. No. 258,471, Apr. 23, 1981, abandoned.

[51] Int. Cl.³ .......................... A47J 37/00; F24B 3/00
[52] U.S. Cl. ..................................... 126/27; 126/373; 126/376
[58] Field of Search .................. 126/27, 373, 376, 377, 126/378, 348

[56] References Cited

U.S. PATENT DOCUMENTS 1,698,225 1/1929 Dick ................................... 126/376

FOREIGN PATENT DOCUMENTS 372362 3/1923 Fed. Rep. of Germany ........ 126/26

Primary Examiner—Larry Jones

[57] ABSTRACT

The present heat controlling cooker cooperates with an electric or gas burner kitchen stove, released stove heat flows under and upward on all sides of a suspended vessel bottom and upward within a created space between suspended vessel and surrounding sidewall of base element. Having the heat controlling handle in the leftside position, as an example, upflowing heat enters into lower peripheral of open aperatures or elongated heat inlets, under the cooking grill which cooks, barbecues or roasts meat or other articles of food principally on bottom side; the upflowing heat also enters into upper opened aperatures or elongated heat inlets whereby the heat is directed on all sides of the food and juice and moisture released from the food is collected directly below in the closed bottom of the suspended vessel.

1 Claim, 5 Drawing Figures

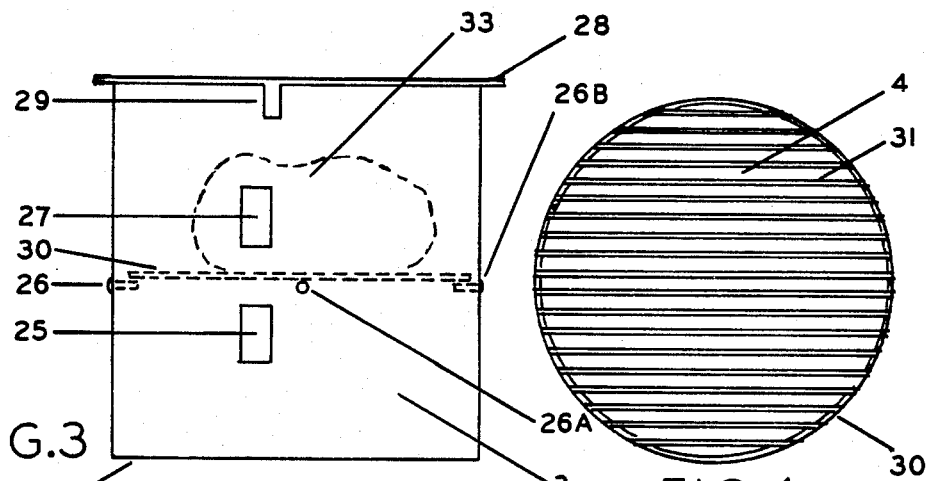
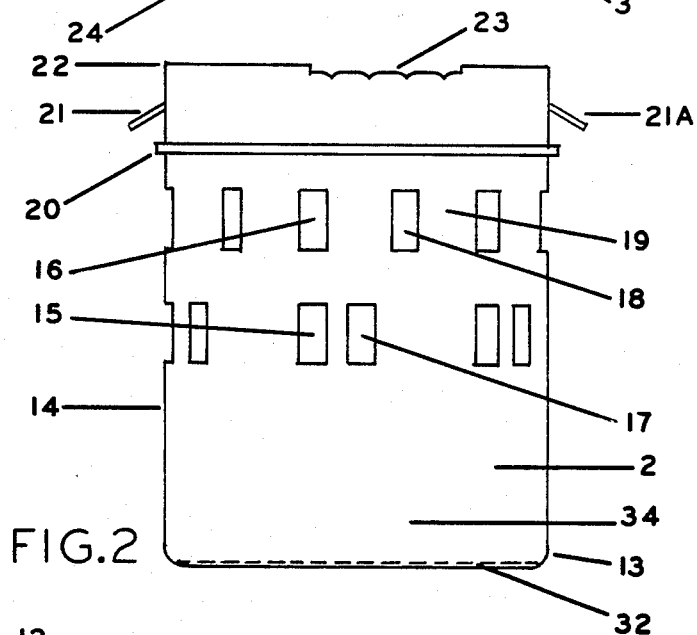
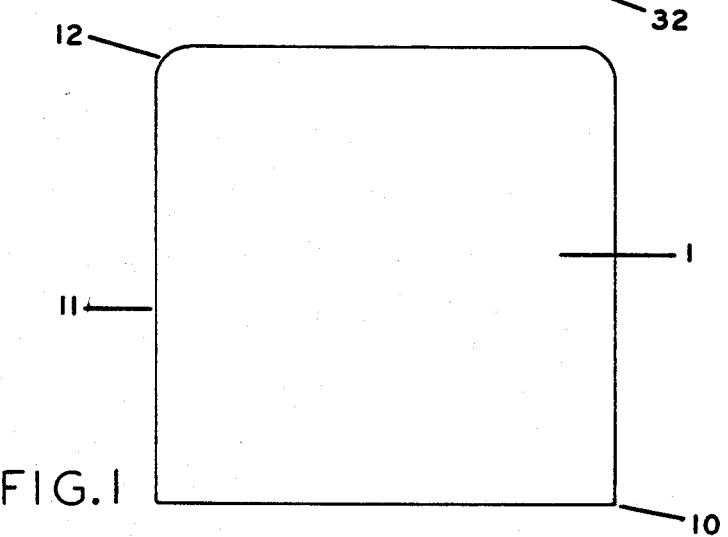

HEAT CONTROLLING COOKER

This application is a continuation of application Ser. No. 258,471, filed Apr. 23, 1981, now abandoned.

SUMMARY OF THE INVENTION

The present cooking device co-operates with an electric or gas burner cooking stove, released stove heat flows under and upward on all sides of the suspended vessel bottom and flows upward; having the heat controlling handle within one of several positions, present position directs the upflowing heat into a peripheral of lower aperatures or elongated heat inlets whereby the heat flows under the cooking grill which cooks, barbecues or roasts meat or other articles of food principally on the bottom side, and having additional features.

BRIEF DESCRIPTION OF THE DRAWINGS

FIG. 1 shows a side view of lower base element which surrounds and supports upper element.

FIG. 2 shows a sideview of an upright body element which suspends within lower base element.

FIG. 3 shows a sideview of a turning element which suspends within upright body element.

FIG. 4 shows a vertical view of a cooking grill, which also shows within FIG. 3

A heat controlling cooking device of which, other objects, novel features and advantages of the invention will be apparent from the following description and accompanying drawings; referring now to the drawings and especially FIGS. 1 to 5 of which FIG. 1 relates to the lower base element 1, which has an open bottom end, and has surrounding sidewall and has an inward protruding upper supporting means; FIG. 2 relates to an upright element having a closed ended suspendable bottom, and having sidewalls, and possessing a peripheral of lower and upper aperatures, elongated heat inlets or the like, of which adjoining peripheral of lower elongated heat inlets, of which adjoining upper peripheral of elongated heat inlets and a peripheral of lower and upper blank spaces, within one pattern of several identical patterns are in the sidewall of the element, and having a peripheral supporting band attached above the heat inlets and having handles attached above the supporting band and upper top having a shallow elongated depression within said top. FIG. 3 is a tubular turning element having an open bottom end and relates to a peripheral of lower and upper aperatures or elongated heat inlets or the like, which has a grill supporting means positioned therebetween and provided with an outward extending top means with a handle attached under the top means. FIG. 4 being an upper cooking grill, having a circular rim with attached across spaced bars, of which when essembled co-operates with an electric or gas burner kitchen stove.

Figure 5:
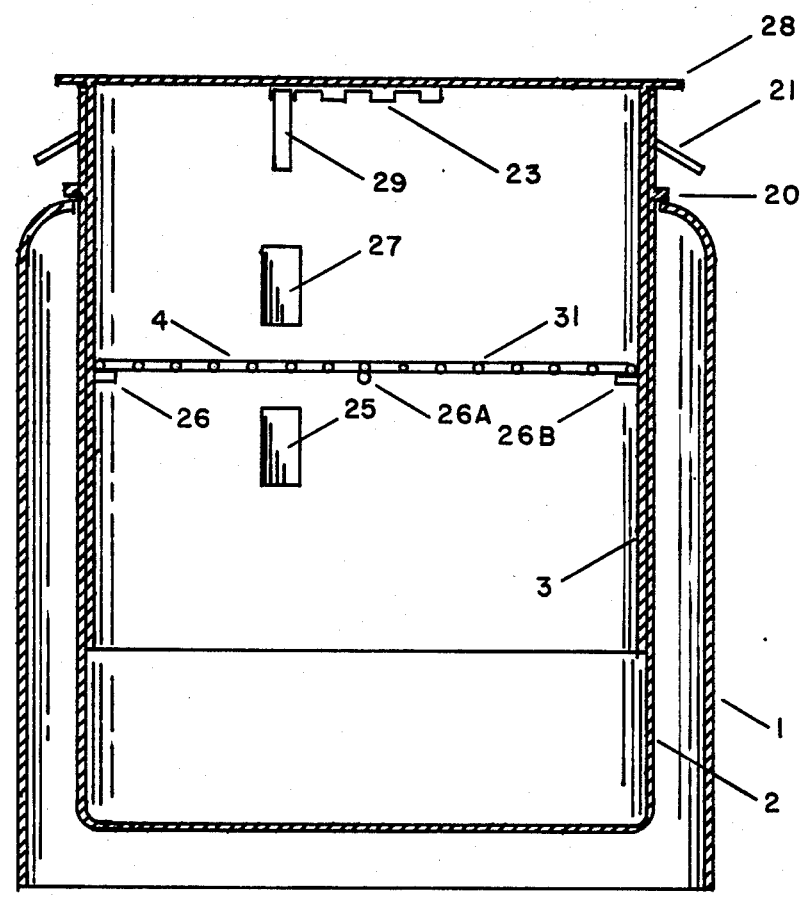
FIG. 5 shows a cross section view of the assembled unit.

Description of the present heat controlling device which has for an object to provide a new and improved device which has four components. Referring first to FIG. 2 which is an upright annular body element 2, 13 designates a closed ended bottom and 14 designates the sidewall of present element of which 15–16 designates a peripheral of lower and upper respectively of one or more aperatures or one or more vertical elongated heat inlets or the like, within vertical alignment, within one of one or more spaces within one pattern of several identical patterns within the sidewall around the element, positioned above center thereof, 17 designates a peripheral of lower elongated heat inlets or the like, within the adjoining space within same pattern, 18 designates a peripheral of upper elongated heat inlets or the like within the same pattern, 19 designates a peripheral of lower and upper, respectively of blank spaces within the one same pattern of several identical patterns within the sidewall around the element, 20 designates a peripheral supporting band close spaced above the said heat inlets, 21 designates handles 21–21a attached on opposing sides close spaced above said supporting band and 22 designates the upper open end of element and 23 designates a horizontal shallow elongated depression within the upper end.

Now referring to FIG. 3 which is a tubular turning element 3 of which 24 designates an open bottom end, 25 designates a peripheral of lower aperatures or vertical elongated heat inlets or the like, within one space within one pattern, close spaced above said bottom end 26 designates three or more inward protruding supporting means 26–26a–26b placed above said lower heat inlets, 27 designates said same peripheral of upper aperatures or elongated heat inlets or the like positioned above supporting means, having lower and upper elongated heat inlets within vertical alignment and syncronize with elongated heat inlets of FIG. 2 element, and 28 designates the upper ended outward protruding rim means and 29 designates a handle attached under the rim means. Now referring to FIG. 4 which is a cooking grill element 4, 30 relates to an outer circular rim and 31 relates to across space slightly flattened bars. Lastly referring to FIG. 1 which is the lower base element 1 of which 10 designates the bottom open end, 11 designates the surrounding sidewall and 12 designates the upper open inward protruding supporting means. Having cooking grill positioned upon said supporting means of turning element; having turning element engaged within and suspended upon upright body element; said body element with aforesaid elements telescopes and engage said supporting band upon said supporting means of lower element which suspends vessel bottom above a cooking grate. Having the cooking device essembled and is positioned upon an electric or gas burner kitchen stove, released heat therefrom flows under and upward on all sides of the suspended vessel bottom, which has covered or coated heat retarding means 32, and heat continues upward within a created space between sidewall 14 of suspended body element and sidewall 11 of surrounding base element, wherein upflowing heat continues upward. Having the heat controlling handle of the turning element within the left side position, as for an example, the upflowing heat enters opened lower and upper aperatures or elongated heat inlets which cook, barbecues or roasts meat 33 or other articles of food on bottom side and also cooks directly upon the sides thereof. Having the heat controlling handle in the adjoining second right side position, upflowing heat only enters opened lower elongated heat inlets which concentrates heat upon bottom sides. Having the heat controlling handle in the adjoining third rightside position, upflowing heat only enters into the upper opened elongated heat inlets which concentrates heat upon all sides of food placed upon the grill. Having the heat controlling handle in the adjoining fourth or last position, upflowing heat is obstructed as all openings in this position are closed and food is in a holding period; stove heat is disengaged. Having provided handles, suspended body element with the food may be lifted and removed from the base element, whenever desired.

Juice and moisture released from the food is collected directly below in the closed bottom 34 of the suspended body element.

Since many changes could be made in the above construction and many apparently widely different embodiments of this invention could be made without departing from the scope thereof, is is intended that all matter contained in the above description or shown in the accompanying drawings shall be interpreted as being illustrated only and not limiting. Providing a simple and effecient new stovetop cooking device.

I claim:

1. A cooker for, use with a stove top burner or heating element heat source comprising;
   - a cylindrical base, including a cylindrical wall, an open bottom, and open top, the area of the bottom being sized to fit over and encircle the heat source;
   - a cylindrical vessel, including a cylindrical wall, a closed bottom, an open top and a plurality of handles located adjacent the open top and a band extending around the wall and located below the handles, the cylindrical wall including a plurality of vertically spaced aperatures, the area of the bottom being less than the area of the open top of the cylindrical base such that the cylindrical vessel is received within the open top of the cylindrical base, with the band of the vessel supported on the edge of the open top of the cylindrical wall of the base;
   - and a cylindrical insert including a cylindrical wall, an open top and an open bottom and including a band extending around the cylindrical wall at the open top, a plurality of supports extending from the cylindrical wall into the cylinder interior and a grate supported on the supports, the insert further including a plurality of vertically disposed aperatures, the spacing between the aperatures corresponding to the spacing between the aperatures of the vessel,
   - the area of the bottom of the insert being less than the area of the container top such that the insert is received in the vessel;
   - whereby, the insert is rotatable within the vessel, to adjust the overlap between the aperatures and to thereby control the quantity of heated air from the heat source entering the insert.

* * * * *